United States Patent
Lynch, Jr. et al.

[11] Patent Number: 5,999,893
[45] Date of Patent: Dec. 7, 1999

[54] CLASSIFICATION SYSTEM AND METHOD USING COMBINED INFORMATION TESTING

[75] Inventors: Robert S. Lynch, Jr., Groton; Peter K. Willett, Coventry, both of Conn.

[73] Assignee: The United States of America as represented by the Secretary of the Navy, Washington, D.C.

[21] Appl. No.: 08/858,186

[22] Filed: May 2, 1997

[51] Int. Cl.⁶ .................................................. G06F 101/14
[52] U.S. Cl. ........................ 702/181; 364/150; 364/194; 712/222
[58] Field of Search ..................... 704/266, 240; 712/221, 222; 382/228; 364/150, 194; 702/181

[56] References Cited

U.S. PATENT DOCUMENTS

| | | | |
|---|---|---|---|
| 4,905,287 | 2/1990 | Segawa | 381/43 |
| 5,245,589 | 9/1993 | Abel et al. | 367/136 |
| 5,467,425 | 11/1995 | Lau et al. | 395/2.52 |
| 5,502,774 | 3/1996 | Bellegarda et al. | 382/159 |
| 5,608,840 | 3/1997 | Tsuboka | 395/2.45 |
| 5,675,706 | 10/1997 | Lee et al. | 395/2.65 |
| 5,710,864 | 1/1998 | Juang et al. | 395/2.47 |

*Primary Examiner*—Marc S. Hoff
*Assistant Examiner*—Kendrick P. Patterson
*Attorney, Agent, or Firm*—Michael J. McGowan; Prithvi C. Lall; Michael F. Oglo

[57] ABSTRACT

A classification system uses sensors to obtain information from which features which characterized a source or object to classified can be extracted. The features are extracted from the information and compiled into a feature vector which is then quantized to one of one of M discrete symbols. After N feature vectors have been quantized, a test vector having components which are defined by the number of occurrences of each of the M symbols in N the quantized vectors is built. The system combines the test vector with training data to simultaneously estimate symbol probabilities for each class and classify the test vector using a decision rule that depends only on the training and test data. The system classifies the test vector using either a Combined Bayes test or a Combined Generalized likelihood ratio test.

2 Claims, 4 Drawing Sheets

FIG. 4

CLASSIFICATION SYSTEM AND METHOD USING COMBINED INFORMATION TESTING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1). Field of the Invention

The present invention relates to classification systems and more specifically to a classifier which combines the information in training and test data to infer about the true symbol probabilities prior to making a classification decision.

(2) Description of the Prior Art

The use of classification systems to classify input data into one of several predetermined classes is well known. Their use has been adapted to a wide range applications including target identification, medical diagnosis, speech recognition, digital communications and quality control systems.

Classification systems decide, given an input X, to which of several output classes X belongs. If known, measurable characteristics separate classes, the classification decision is straightforward. However, for most applications, such characteristics are unknown, and the classification system must decide which output class the input most closely resembles. In such applications, the output classes and their characteristics are modeled (estimated) using statistics for the classes derived from training data belonging to known classes. Thus, the standard classification approach is to first estimate the statistics from the given training data and then to apply a decision rule using these estimated statistics.

However, often there is insufficient training data to accurately infer the true statistics for the output classes which results in reduced classification performance or more occurrences of classification errors. Additionally, any new information that arrives with the input data is not combined with the training data to improve the estimates of the symbol probabilities. Furthermore, changes in symbol probabilities resulting from changes, which may be unobservable, in the source of test data, the sensors gathering data or the environment often result in reduced classification performance. Therefore, if based on the training data a classification system maintains a near zero probability for the occurrence of a symbol and the symbol begins to occur in the input data with increasing frequency, classification errors are likely to occur if the new data is not used in determining symbol probabilities.

Attempts to improve the classification performance and take advantage of information available in test data have explored combining the test data with the training data in modeling class statistics and making classification decisions. While these attempts have indicated that improved classification performance is possible, they have one or more drawbacks which limit or prevent their use for many classification systems.

One early approach to combining the training and test data to estimate class statistics is described in A. Nádas, "Optimal Solution of a Training Problem in Speech Recognition," *IEEE Trans. Acoust., Speech, Signal Processing*, vol. ASSP-33, no. 1 (1985), pp. 326–329. In Nádas, the input (test) data which comprised a sample to be classified was combined with the training data to obtain an estimate of the probability distribution for each of the classes. However, the result in Nádas showed that combining the test sample with the training data did not provide improved performance but resulted in classification decision based on a standard general likelihood ratio test.

A second approach to combining the training data with test data is found in Merhav et al, "A Bayesian Classification Approach with Application to Speech Recognition," *IEEE Trans. Signal Processing*, vol. 39, no. 10 (1991) pp. 2157–2166. In Merhav et al classification decision rules which depend on the available training and test data were explored. A first decision rule which is a Bayesian rule was identified. However, this classification rule was not fully developed or evaluated because the implementation and evaluation of the probability density functions required are extremely complex.

The second classification rule is based on generalized likeihood ratios. While this rule was shown to provide improved classification performance, it suffers from several drawbacks. The decision rule requires a training algorithm based on hidden Markov models be evaluated for each output class for every test data vector received to estimate the probability functions. This training requirement is computationally intensive and typically requires a significant amount of time to converge. Thus, the rule would be relatively complex and difficult to implement, particularly for applications in real time. Furthermore, such a system would be costly and require a relatively large amount of space. Additionally, because the rule relies on hidden Markov model in estimating probability distributions, it is not readily adapted to different classification applications.

Thus, what is needed is a classification system which can be easily and readily implemented, which is readily adaptable to various applications and which uses all the available data including the information in the training data and test data to estimate the true symbol probabilities prior to making a classification decision.

SUMMARY OF THE INVENTION

Accordingly, it is a general purpose and object of the present invention to provide a classifier which uses the information in the training and test data to estimate the true symbol probabilities.

Another object of the present invention is to provide a classification system and method which uses quantized training and test data to re-estimate symbol probabilities before each classification decision.

Yet another object of the present invention is the provision of a classification system which depends only on the available training and test data and is readily implemented and easily adapted to a variety of classification applications.

It is a further object of the present invention to provide a combined classification system which combines the test data and the training data to simultaneously estimate the symbol probabilities for all output classes and classify the test data.

These and other objects made apparent hereinafter are accomplished with the present invention by providing a combined classification system which combines the information available in the training and test data to estimate the true symbol probabilities prior to making a classification decision. The combined classification system represents each class using a combined multinomial model. Based on this combined multinomial model, the system classifies the test data using one of two likelihood ratio tests.

The combined classification system uses sensors to obtain information on sources or objects to be classified. Features which characterize the sources or objects are extracted from the information and compiled into a feature vector. Each feature vector is then quantized to one of one of M discrete symbols. After N feature vectors have been quantized, a test vector having components defined by the number of occurrences of each of the M symbols in N the quantized vectors is built. The system combines the test vector with quantized training data to estimate symbol probabilities for each class and classify the test vector using a decision rule that depends only on the training and test data. This estimation and classification can be accomplished using either a Combined Bayes test wherein symbol probabilities for each class are inferred from the number of occurrences of the symbols within the training and test data or a Combined Generalized likelihood ratio test wherein symbol probabilities are estimated by using the maximum likelihood estimates of the number of occurrences of the symbols.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

When using discrete, or quantized, data for input to a classification system, the probability of the number of occurrences of the symbols can properly be modeled using a multinomial distribution. Prior art classification systems, when using quantized training and test data and a probabilistic model for each class, generally use a method of testing based on a generalized likelihood ratio test (GLRT). A diagram illustrating the classification method used by prior art, GLRT based classification system is shown in FIG. 1.

Figure 1:
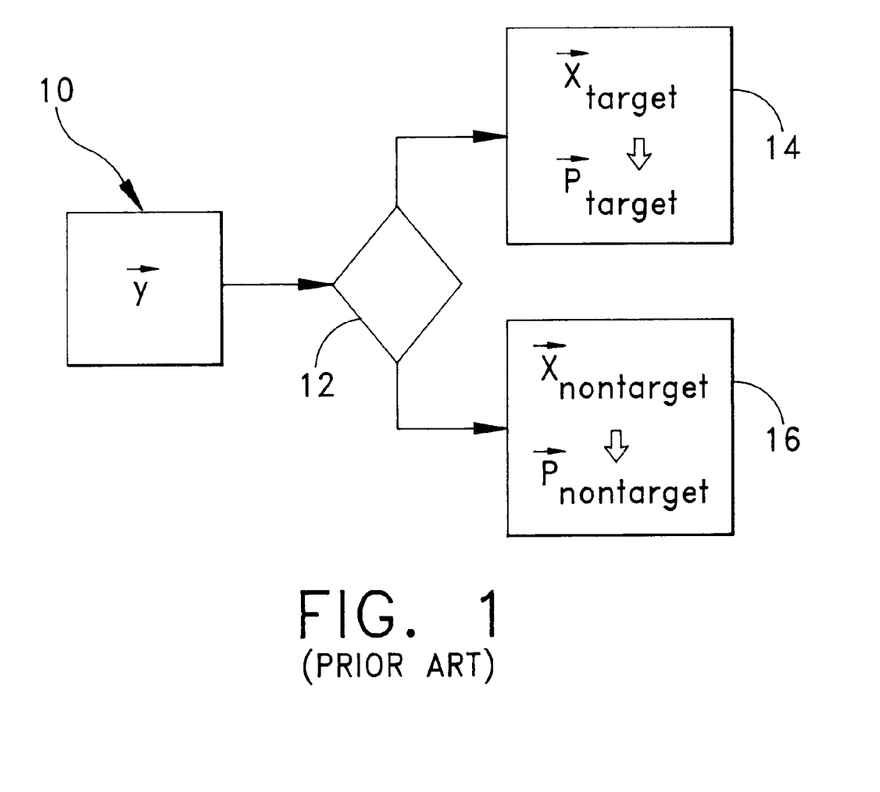
FIG. 1 is a diagram illustrating the function of a prior art GLRT based classification system.

In FIG. 1, input 10 comprising a test vector $\vec{y}$ is fed to classification test 12. Classification test 12 decides which model, class model 14 or class model 16, the input vector $\vec{y}$ is most like. For a binary (e.g., target or nontarget) classification decision using quantized data, classification test 12 for a GLRT based classification system can be written in the form:

$$\frac{P(\vec{y} \mid \hat{\vec{p}}_k)}{P(\vec{y} \mid \hat{\vec{p}}_l)} = \prod_{i=1}^{M} \frac{\hat{p}_{k,i}^{y_i}}{\hat{p}_{l,i}^{y_i}} \overset{k}{\underset{l}{>}} \tau \quad (1)$$

where $\tau$ is the classification threshold; $\vec{y}$ is the test vector; k,l ∈ {target,nontarget} and k≠l; $\hat{\vec{p}}_k$ is the estimate of the symbol probability vector for class k; M is the number of quantizing symbols used; and $y_i$, is the number of occurrences of the $i^{th}$ symbol in the test data. The estimates of the symbol probabilities in equation (1) are given by:

$$\hat{p}_{k,i} = \frac{x_{k,i}}{N_k} \text{ and } \hat{p}_{l,i} = \frac{x_{l,i}}{N_l} \quad (2)$$

where $x_{k,i}$ is the number of occurrences of the $i^{th}$ symbol in the training data for class k; and $$N_k \left\{ N_k = \sum_{i=1}^{M} x_{k,i} \right\}$$

is the total number of occurrences of the M symbols in the training data for class k.

As can be seen from FIG. 1 and equations (1) and (2), the symbol probabilities depend entirely on the training data and the classification test amounts to determining to which class model does the test vector have a stronger relationship. That is, does the test vector most resemble the symbol probabilities for a target ($\vec{p}_{target}$) based the target training vector ($\vec{x}_{target}$) or the symbol distribution for a nontarget ($\vec{p}_{nontarget}$) based the nontarget training vector ($\vec{x}_{nontarget}$). As can be seen, when the training data is insufficient to accurately infer the symbol probabilities, classification errors can occur.

To reduce the effects of problems associated with standard GLRT based classification systems, the present invention provides a combined classification system and method in which each possible class is modeled by combining the information in the training and test data to infer about the true symbol probabilities prior to making a classification decision. A diagram illustrating the function of a combined classification system of the present invention is shown in FIG. 2.

Figure 2:
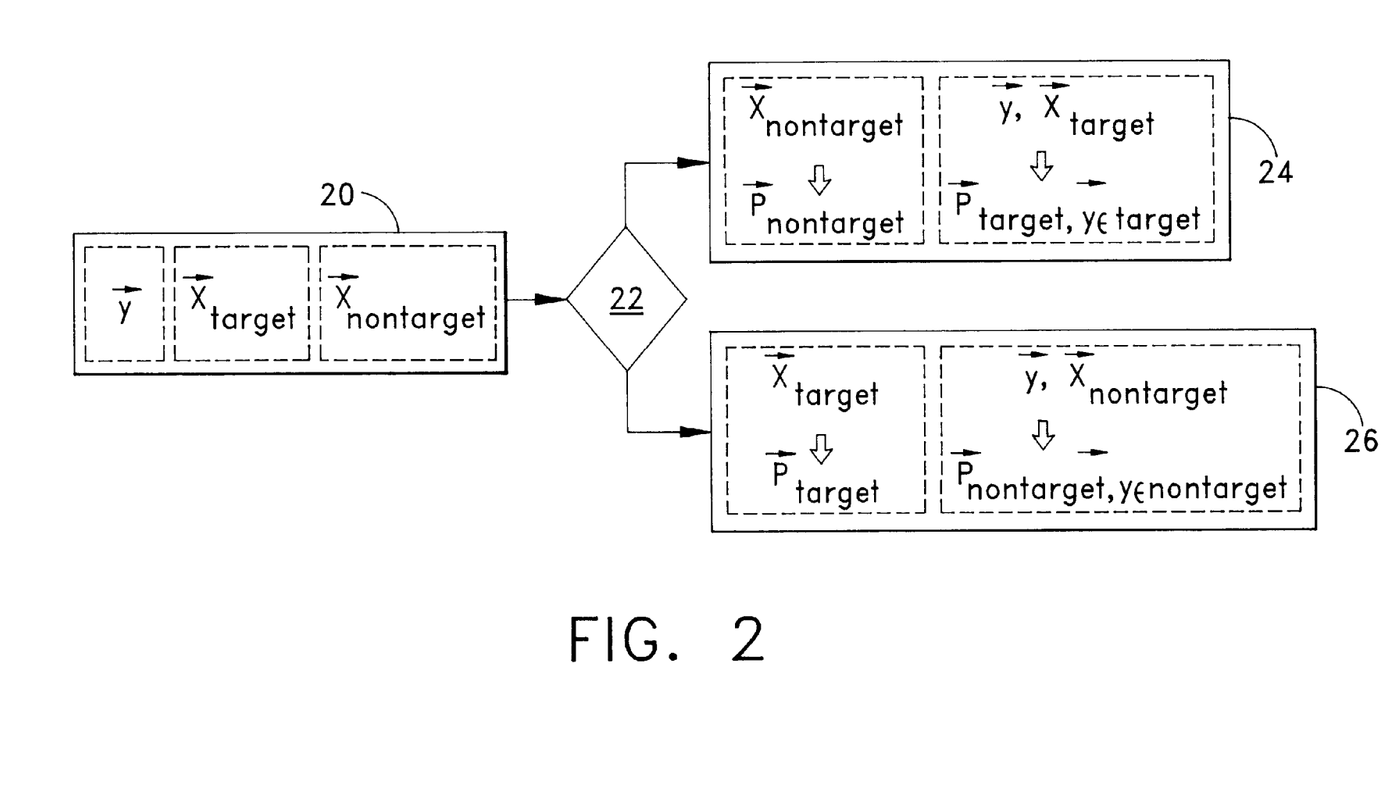
FIG. 2 is a diagram illustrating the function of a combined classification system of the present invention.

Referring to FIG. 2, the input 20 to classification test 22 comprises all available training data for each class ($\vec{x}_{target}$, $\vec{x}_{nontarget}$) and a test vector $\vec{y}$. Classification test 22 uses input 20 to decide which class model the combination of all data, $\vec{x}_{target}$, $\vec{x}_{nontarget}$ and $\vec{y}$, belongs. Test 22 chooses between class model 24 and class model 26. In class model 24 (target class) the nontarget symbol probabilities $\vec{p}_{nontarget}$ are determined solely from the nontarget training data $\vec{x}_{nontarget}$ while the symbol probabilities for the target ($\vec{p}_{target,y \in target}$) are determined from both $\vec{x}_{target}$ and $\vec{y}$ conditioned on $\vec{y}$ being a target. Similarly, for model 26 (nontarget class) the target symbol distribution $\vec{p}_{target}$ is determined solely from the target training data $\vec{x}_{target}$ while the symbol probabilities for a nontarget ($\vec{p}_{target,y \in target}$) are determined from both $\vec{x}_{nontarget}$ and $\vec{y}$ conditioned on $\vec{y}$ being a nontarget.

Thus, classification test 22 combines the test data vector $\vec{y}$ and both training data vectors, $\vec{x}_{target}$ and $\vec{x}_{nontarget}$, to simultaneously estimate the actual symbol probabilities under both classes, class models 24 and 26, and to perform the classification test. Under test 22, each class is represented using a combined multinomial model. If the number of occurrences of the quantized symbols are assumed independent and identically distributed multinomially distributed random variables, the probability of the number of occurrences of the symbols in the training and test data with the input test data $\vec{y}$ being a member of class k is given as:

$$P(\vec{x}_k, \vec{x}_l, \vec{y} \mid \vec{p}_k, \vec{p}_l, \vec{y} \in k) = N_k! N_l! N_{\vec{y}}! \prod_{i=1}^{M} \frac{p_{k,i,\vec{y} \in k}^{x_{k,i}+y_i} p_{l,i}^{x_{l,i}}}{x_{k,i}! x_{l,i}! y_i!} \quad (3)$$

where k,l∈{target,nontarget} and k≠l; M is the number of quantizing symbols used; $x_{k,i}$ is the number of occurrences of the $i^{th}$ symbol in the training data for class k; $x_{l,i}$ is the number of occurrences of the $i^{th}$ symbol in the training data for class l; $y_i$ is the number of occurrences of the $i^{th}$ symbol in the test data;

$$N_k \left\{ N_k = \sum_{i=1}^{M} x_{k,i} \right\}$$

is the total number of occurrences of the M symbols in the training data for class k;

$$N_l \left\{ N_l = \sum_{i=1}^{M} x_{l,i} \right\}$$

is the total number of occurrences of the M symbols in the training data for class l;

$$N_{\vec{y}} \left\{ N_{\vec{y}} = \sum_{i=1}^{M} y_i \right\}$$

is the total number of occurrences of the M symbols in the test data (the number of quantized feature vectors); and $$p_{k,i,\vec{y} \in k} \left\{ \sum_{i=1}^{M} p_{k,i,\vec{y} \in k} = 1 \right\} \left( p_{k,i} \left\{ \sum_{i=1}^{M} p_{k,i} = 1 \right\} \right)$$

is the probability of the $i^{th}$ symbol conditioned (not conditioned) on the test data being an element of class k.

Using the combined multinomial model given by equation (3), classification test 22 can be implemented as a likelihood ratio test in either of two forms. The first combined classification test, hereinafter referred to as a Combined Bayes Test, is derived by applying Bayes rule to the numerator and denominator of the ratio using equation (3) under both classes and assigning the uniform prior distribution:

$$P(\vec{p}_k) = (M-1)! \delta \left( \sum_{i=1}^{M} p_{k,i} - 1 \right) \quad (4)$$

to the symbol probabilities of each class. Equation (4) is obtained from the multivariate beta density, also called the Dirichlet. The result is then integrated with respect to the symbol probabilities over the unit simplex to yield the Combined Bayes Test given by:

$$\frac{P(\vec{x}_k, \vec{x}_l, \vec{y} \mid \vec{y} \in k)}{P(\vec{x}_k, \vec{x}_l, \vec{y} \mid \vec{y} \in l)} = \quad (5)$$

$$\frac{(N_l + N_{\vec{y}} + M - 1)!(N_k + M - 1)!}{(N_k + N_{\vec{y}} + M - 1)!(N_l + M - 1)!} \prod_{j=1}^{M} \frac{(x_{k,i} + y_i)!(x_{l,i})!}{(x_{l,i} + y_i)!(x_{k,i})!} \begin{matrix} > \\ < \end{matrix} \tau . \begin{matrix} k \\ l \end{matrix}$$

The second test, herein referred to as the Combined GLRT, is based on the maximum likelihood estimates of the symbol probabilities in the training and test data and is defined by:

$$\frac{P(\vec{x}_k, \vec{x}_l, \vec{y} \mid \hat{\vec{p}}_{k,i,\vec{y} \in k}, \hat{\vec{p}}_l, \vec{y} \in k)}{P(\vec{x}_k, \vec{x}_l, \vec{y} \mid \hat{\vec{p}}_k, \hat{\vec{p}}_{l,\vec{y} \in l}, \vec{y} \in l)} = \prod_{j=1}^{M} \frac{\hat{p}_{k,i,\vec{y} \in k}^{x_{k,i}+y_i} \hat{p}_{l,i}^{x_{l,i}}}{\hat{p}_{l,i,\vec{y} \in l}^{x_{l,i}+y_i} \hat{p}_{k,i}^{x_{k,i}}} \begin{matrix} > \\ < \end{matrix} \tau \begin{matrix} k \\ l \end{matrix} \quad (6)$$

where the estimates for the symbol probabilities are given by:

$$\hat{p}_{k,i,\vec{y} \in k} = \frac{x_{k,i} + y_i}{N_k + N_{\vec{y}}}, \quad (7)$$

$$\hat{p}_{l,i,\vec{y} \in l} = \frac{x_{l,i} + y_i}{N_l + N_{\vec{y}}}, \quad (8)$$

$$\hat{p}_{k,i} = \frac{x_{k,i}}{N_k}, \quad (9)$$

and $$\hat{p}_{l,i} = \frac{x_{l,i}}{N_l}. \quad (10)$$

Figure 3:
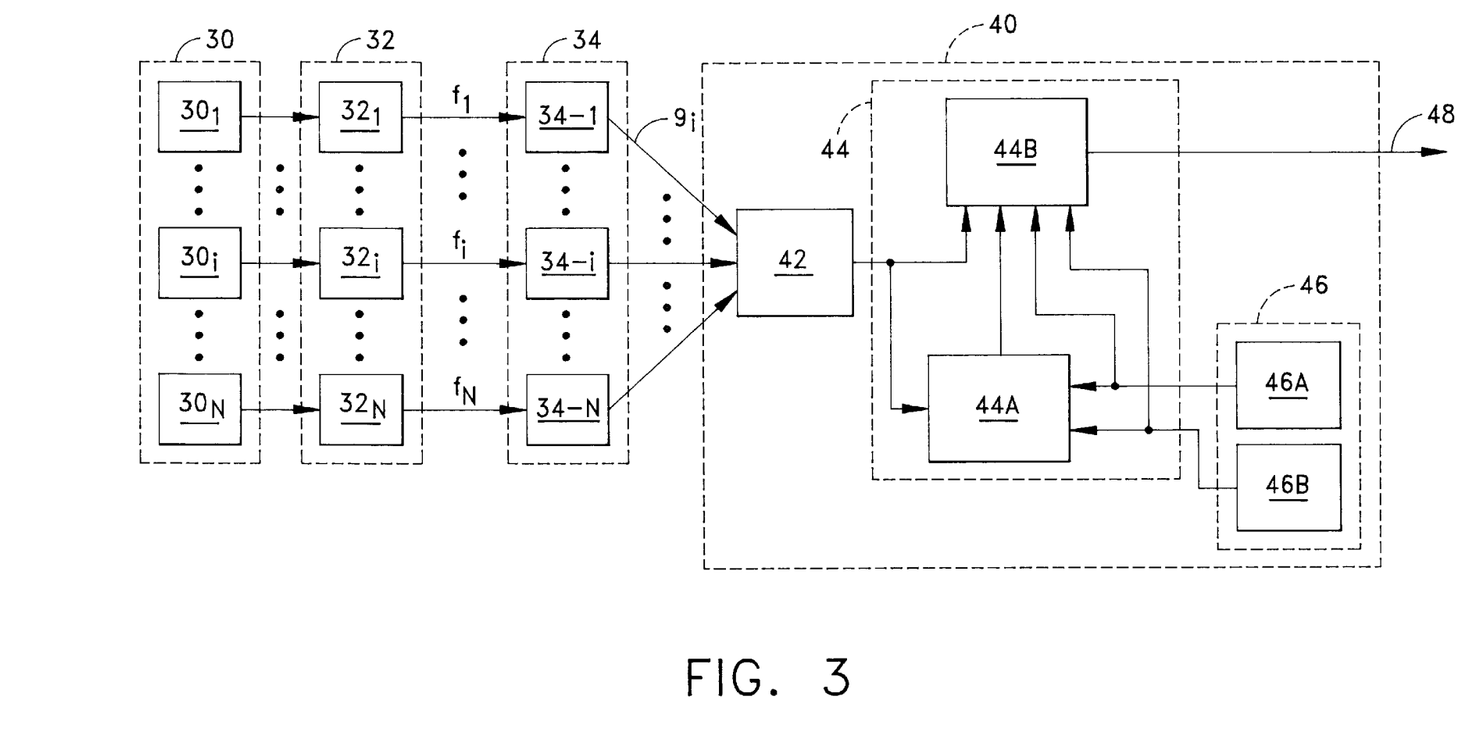
FIG. 3 is a block diagram of a combined information classification system in accordance with the present invention.

Referring now to FIG. 3, there is shown a block diagram of a combined information classification system in accordance with the present invention. However, while the present invention will be described relative to an acoustic sensor based target/nontarget classification system, it is to be understood that the novel features of the invention are applicable to any classification system using quantized data.

Sensors $30_1 \ldots 30_i \ldots 30_N$ gather information on objects or sources to be classified and pass the data to a respective feature extraction processor $32_i$. For an acoustic-based target classification system, each sensor $30_i$ which may be either an active or passive sensor gathers acoustic data from the surrounding environment and converts the data to an electric signal which can be converted to series of digital values or directly passed to extraction processor $32_i$. Each sensor $30_i$ must operate independently of the others. Thus, each sensor $30_i$ can be a separate system operating independently of the others. Alternatively, each sensor $30_i$ can be an independent component of a single sensor system 30. That is, each sensor $30_i$ can be an element or sub-array within sonar array 30 provided the data remains and is processed independently of the data received by other sensors.

Each processor $32_i$ receives and processes the digital signal in a known manner to obtain selected characteristics which identify a signal and or track such as frequency, bandwidth, tonals, range, range rate, bearing, and/or bearing rate used for classification. Processor $32_i$ extracts features from the signal and track characteristics and builds a feature vector $f_i$ which is passed to vector quantizer 34. When building feature vectors, each processor $32_i$ builds one feature vector for each batch of data received from sensor $30_i$. That is, as each sensor $30_i$ sends data to processor $32_i$, the processor collects the data into batches for processing and feature extraction using any known technique. Processor $32_i$ extracts features and builds the feature vector using any known method. In FIG. 3 for each sensor $30_i$ an associated processor $32_i$ is shown to generate the feature vectors passed to quantizer 34. However, a single processor 32 can be used to build and pass the feature vectors to quantizer 34. provided each feature vector is generated independently of the other feature vectors.

Vector quantizer 34 generates a quantized feature vector $q_i$ for each feature vector $f_i$ received from processor 32 and passes the quantized feature vector $q_i$ to combined classification system 40. A quantized feature vector $q_i$ is generated for each feature vector $f_i$ received by converting each feature vector to one of M discrete symbols. Both the number of quantizing symbols M and the method used for quantizing will vary with the application. The number of quantizing symbols M is selected with respect to the Cartesian product of the features with the feature vector. Preferably, the number of quantizing symbols M is selected for optimum performance based upon the numbers of training and test data.

The quantizing method used varies with the feature vectors used. For feature vectors in which each feature has a limited number of discrete values, a unique quantized symbol can be assigned to each possible feature vector. For example, a feature vector having two features $(f_1, f_2)$ where each feature has three possible values (1,2,3) can be quantized to one of nine levels (quantized symbols) as shown in table 1. For more complex feature vectors such as where one or more of the features are continuous functions, a more robust quantizing method may be needed. The third column of Table 1 indicating number of occurrences is discussed below in reference to combined classification system 40 and vector processor 42.

TABLE 1

| Feature Vector | Quantized Symbol | Number of Occurrences |
| --- | --- | --- |
| 1, 1 | 1 | 8 |
| 1, 2 | 2 | 12 |
| 1, 3 | 3 | 23 |
| 2, 1 | 4 | 10 |
| 2, 2 | 5 | 6 |
| 2, 3 | 6 | 15 |
| 3, 1 | 7 | 3 |
| 3, 2 | 8 | 9 |
| 3, 3 | 9 | 14 |

Combined classification system 40 comprises vector processor 42 for building a test vector $\vec{y}$; symbol probability estimator 44A for estimating symbol probabilities for each output class; and classification test 44B, responsive to the training data from memory 46, test vector $\vec{y}$ and the symbol probabilities from estimator 44A, for performing a classification test.

Vector processor 42 receives quantized feature vectors $q_i$ from quantizer 34 and builds test data vector $\vec{y}$. Processor 42 receives quantized feature vectors from quantizer 34 and sums the number of occurrences of each quantized symbol received. After $N_{\vec{y}}$ quantized vectors have been received, processor 42 builds a test vector $\vec{y}$ in which the components are defined by the number of occurrences of each of the M symbols in $N_{\vec{y}}$ the quantized feature vectors $q_1 \ldots q_n$ received. That is, if processor 42 builds a test vector from $N_{\vec{y}} = 100$ quantized feature vectors in which the number of occurrences for each symbol is as indicated in Table 1, the resulting a test vector $\vec{y}$ would be given by $\vec{y} = \{8, 12, 23, 10, 6, 15, 3, 9, 14\}$.

Classification processor 44 receives test data vector $\vec{y}$ from processor 42 along with the quantized training data, $\vec{x}_{target}$ from memory 46A and $\vec{x}_{nontarget}$ from memory 46B and provides the chosen class at output 48. The quantized training data is compiled in the same manner as the test data vector $\vec{y}$. That is, the number of occurrences of each of the M symbols in the $N_{target}$ quantized feature vectors in the training data for the target class define the components of training data vector $\vec{x}_{target}$. Similarly, the number of occurrences of each of the M symbols in the $N_{nontarget}$ quantized feature vectors in the training data for the nontarget class define the components of training data vector $\vec{x}_{nontarget}$.

Processor 44 uses the received data to estimate the symbol probabilities for each class using estimator 44A and to perform classification test 44B using the symbol probability estimates and the received data. In a preferred embodiment, processor 44 simultaneously estimates the symbol probabilities for each class and performs a classification test. This simultaneous estimation and classification can be accomplished using either the Combined Bayes test given by equation (5) or the Combined GLRT given by equation (6). In the Combined GLRT, the symbol probabilities are estimated by using the maximum likelihood estimates of the number of occurrences of the symbols as given by equations (7)–(10). Similarly, in the Combined Bayes test, although the symbol probability estimates are a priori assigned the uniform distribution given in equation (4), as is readily apparent from equation (5), the symbol probabilities for each class are inferred from the number of occurrences of the symbols within the training and test data.

In operation, independent sensors $30_i$ gather information on objects or sources to be classified from which features which characterize the source or object to classified can be extracted. Processors $32_i$ extract features from the information and compile the features into a feature vector $f_i$. Each feature vector is then quantized to one of one of M discrete symbols by a quantizer $34_i$ and passed to vector processor 42. For every N feature vectors received by vector processor 42 a test vector having components which are defined by the number of occurrences of each of the M symbols in N the quantized vectors is built. Classification processor 44 combines the test vector with training data stored in memory 46 to simultaneously estimate symbol probabilities for each class and classify the test vector using either a Combined Bayes test or a Combined Generalized likelihood ratio test.

Figure 4:
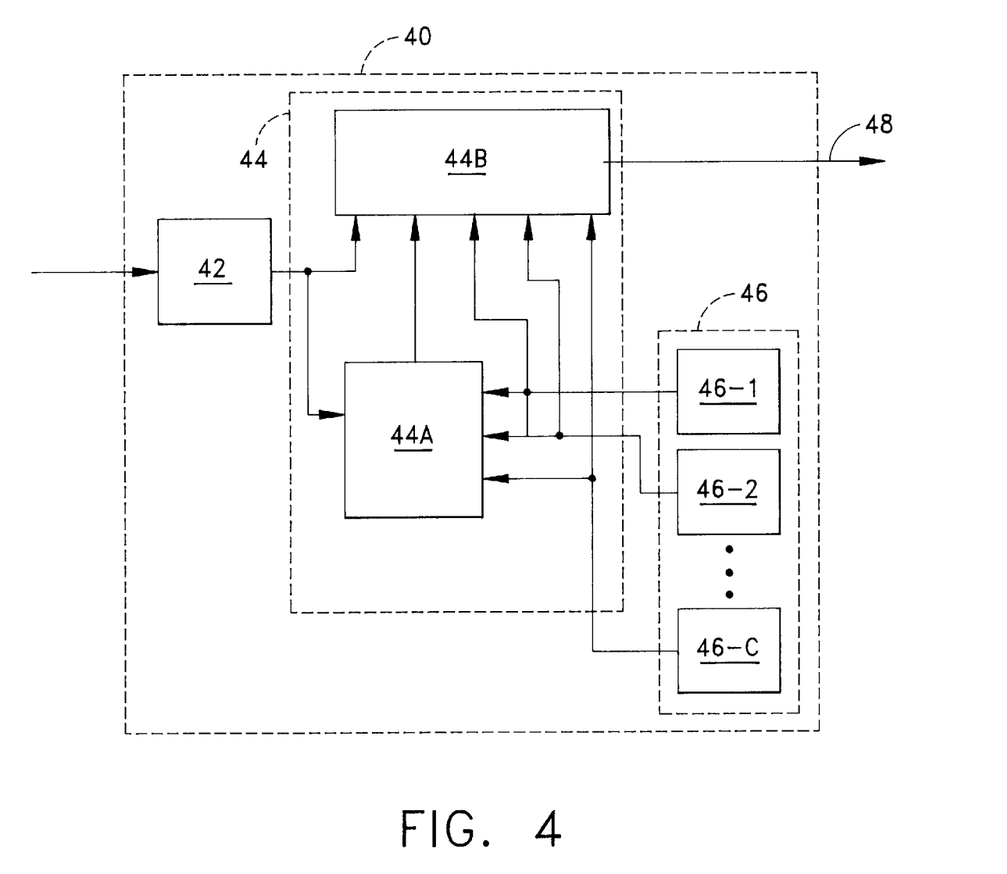
FIG. 4 is a diagram illustrating a combined classification system for classifying test data into one of several available classes.

The classification system shown in FIG. 3 can be extended to classify a test vector into one of several output classes. This can be seen in FIG. 4 in which is shown a block diagram of a combined classification system 40 for classifying quantized test data into one of several available classes. Referring now to FIG. 4, combined classification system 40 operates to classify quantized feature vectors into one of C distinct classes. Vector processor 42 receives quantized feature vectors $q_i$ and builds a test data vector $\vec{y}$, the components of which are defined by the number of occurrences of each of the M symbols over all of the quantized feature vectors received. After compiling the test data vector, processor 42 passes the vector $\vec{y}$, to classification processor 44.

Classification processor 44 receives test vector $\vec{y}$ from processor 42 along with the quantized training data $\vec{x}_1, \vec{x}_2,$ ... $\vec{x}_c$, for each of the C classes from memory 46 and provides the chosen class at output 48. Symbol probability estimator 44A receives the test vector $\vec{y}$ and training data for each of the classes ($\vec{x}_1, \vec{x}_2, \ldots \vec{x}_c$) and estimates symbol probabilities under all classes. Classification test 44B uses the training data $\vec{x}_1, \vec{x}_2, \ldots \vec{x}_c$, from memory 46, test vector $\vec{y}$ and the symbol probabilities from estimator 44A to classify the test vector.

In a preferred embodiment, processor 44 simultaneously estimates the symbol probabilities for each class and performs a classification test. The simultaneous estimation and classification can be accomplished by extending the either of the two combined information tests used in the binary classification system described in reference to FIG. 3. For choosing one of C distinct classes using the Combined Bayes test, the following decision rule is used:

$$\max_{1 \le k \le C} \left[ \prod_{i=1}^{M} \prod_{\substack{l=1 \\ l \ne k}}^{C} \frac{(x_{k,i} + y_i)!}{(N_k + N_{\vec{y}} + M - 1)!(N_l + M - 1)!(x_{k,i})!} \right] \quad (11)$$

For choosing one of C distinct classes using the combined GLRT test the following decision rule is used:

$$\max_{1 \le k \le C} \left[ \prod_{i=1}^{M} \prod_{\substack{l=1 \\ l \ne k}}^{C} \hat{p}_{k,i,\vec{y} \in k}^{x_{k,i}+y_i} \hat{p}_{l,i}^{x_{l,i}} \right] \quad (12)$$

where $$\hat{p}_{k,i,\vec{y} \in k} = \frac{x_{k,i} + y_i}{N_k + N_{\vec{y}}} \quad (13)$$

and $$\hat{p}_{l,i} = \frac{x_{l,i}}{N_l}. \quad (14)$$

What has thus been described is a combined information classification system which uses all the available data including the information in the training and test data to estimate the true symbol probabilities prior to making a classification decision. The invention is readily adapted to different classification applications including speech and image recognition. Furthermore the decision rule can be modified to consider use of a non-uniform prior distribution. Additionally the invention can be implemented with the classification decisions being made in real time.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An information classification system combining training data and test data to classify a source which comprises:

a vector processor formulating a plurality of feature vectors depicting characteristics of said test data and for receiving said plurality of feature vectors wherein each of said plurality of feature vectors is quantized to one of M symbols and for generating a quantized test vector $\vec{y}$ having as components the number of occurrences of each of the M symbols in said plurality of quantized feature vectors received;

means for storing quantized training data, said quantized training data having one quantized training vector $\vec{x}_c$ for each class of a plurality of output classes; and a classification processor, responsive to said quantized test vector and said quantized training data, for estimating sysmbol probabilities for each output class and for classifying the quantized test vector $\vec{y}$ unto one of said plurity output classes, wherein said classification processor estimates the symbol probabilities for each output class and classifies the quantized test vector using a combined Bayes test given by $$\frac{P(\vec{x}_k, \vec{x}_l, \vec{y} | \vec{y} \in k)}{P(\vec{x}_k, \vec{x}_l, \vec{y} | \vec{y} \in l)} =$$

$$\frac{(N_l + N_{\vec{y}} + M - 1)!(N_k + M - 1)!}{(N_k + N_{\vec{y}} + M - 1)!(N_l + M - 1)!} \prod_{j=1}^{M} \frac{(x_{k,i} + y_i)!(x_{l,i})!}{(x_{l,i} + y_i)!(x_{k,i})!} \overset{k}{\underset{l}{\gtrless}} \tau$$

wherein $X_{k,i}$ is the number of occurrences of the $i^{th}$ symbol in a quantized training vector for class k; $x_{l,i}$ is the number of occurrences of the $i^{th}$ symbol in a quantized training vector for class l; $y_i$ is the number of occurrences of the $i^{th}$ symbol in the quantized test vector;

$$N_k \left\{ N_k = \sum_{i=1}^{M} x_{k,i} \right\}$$

is the total number of occurrences of the M symbols in the training data for class k;

$$N_l \left\{ N_l = \sum_{i=1}^{M} x_{l,i} \right\}$$

is the total number of occurrences of the M symbols in the training data for class l; and $$N_{\vec{y}} \left\{ N_{\vec{y}} = \sum_{i=1}^{M} y_i \right\}$$

is the total number of occurrences of the M symbols in the quantized feature vectors.

2. An information classification system combining training data and test data to classify a source which comprises:

a vector processor formulating a plurality of feature vectors depicting characteristics of said test data and for receiving said plurality of feature vectors wherein each of said plurality of feature vectors is quantized to one of M symbols and for generating a quantized test vector $\vec{y}$ having as components the number of occurrences of each of the M symbols in said plurality of quantized feature vectors received;

means for storing quantized training data, said quantized training data having one quantized training vector $\vec{x}_c$ for each class of a plurality of output classes; and a classification processor, responsive to said quantized test vector and said quantized training data, for estimating sysmbol probabilities for each output class and for classifying the quantized test vector $\vec{y}$ unto one of said plurity output classes, wherein said classification processor estimates the symbol probabilities for each one of C output classes and classifies the quantized test vector into one of the C output classes using a combined Bayes test given by $$\max_{1 \le k \le C} \left[ \prod_{i=1}^{M} \prod_{\substack{l=1 \\ l \ne k}}^{C} \frac{(x_{k,i} + y_i)!}{(N_k + N_y + M - 1)!(N_l + M - 1)!(x_{k,i})!} \right]$$

in which $x_{k,i}$ is the number of occurrences of the $i^{th}$ symbol in a quantized training vector for class k, $y_i$ is the number of occurrences of the $i^{th}$ symbol in the quantized test vector, $N_k$ is the total number of occurrences of the M symbols in the training data for class k, $N_l$ is the total number of occurrences of the M symbols in the training data for class l, and is the total number of occurrences of the M symbols in the quantized feature vectors.

* * * * *